(12) United States Patent
Church et al.

(10) Patent No.: US 10,500,830 B2
(45) Date of Patent: Dec. 10, 2019

(54) METHOD AND APPARATUS FOR 3D FABRICATION

(71) Applicant: nScrypt, Inc., Orlando, FL (US)

(72) Inventors: Kenneth H. Church, Orlando, FL (US); Josh Goldfarb, Orlando, FL (US); Michael W. Owens, Orlando, FL (US); Xudong Chen, Orlando, FL (US); Paul Deffenbaugh, Orlando, FL (US); Daniel Silva, Orlando, FL (US); Charles Michael Newton, Orlando, FL (US)

(73) Assignee: nScrypt, Inc., Orlando, FL (US)

( * ) Notice: Subject to any disclaimer, the term of this patent is extended or adjusted under 35 U.S.C. 154(b) by 749 days.

(21) Appl. No.: 14/812,940

(22) Filed: Jul. 29, 2015

(65) Prior Publication Data
US 2016/0031159 A1 Feb. 4, 2016

Related U.S. Application Data

(60) Provisional application No. 62/030,378, filed on Jul. 29, 2014.

(51) Int. Cl.
*B29C 64/209* (2017.01)
*B29C 64/295* (2017.01)
(Continued)

(52) U.S. Cl.
CPC .......... *B33Y 30/00* (2014.12); *B29C 48/2566* (2019.02); *B29C 48/25686* (2019.02); *B29C 48/2886* (2019.02); *B29C 48/865* (2019.02); *B29C 48/872* (2019.02); *B29C 48/873* (2019.02); *B29C 64/106* (2017.08);
(Continued)

(58) Field of Classification Search
CPC ... B29C 64/106; B29C 64/118; B29C 64/209; B29C 64/295; B29C 64/329; B29C 47/1027; B29C 47/1045; B29C 47/862; B29C 48/2566; B29C 48/25686; B29C 48/288; B29C 48/2886; B29C 48/865;
(Continued)

(56) References Cited

U.S. PATENT DOCUMENTS 9,085,109 B2 7/2015 Schmehl et al.
2011/0076496 A1 3/2011 Batchelder et al.
(Continued)

FOREIGN PATENT DOCUMENTS

CN 203357906 U 12/2013

OTHER PUBLICATIONS

The Search Report of PCT/US2015/042712 dated Oct. 28, 2015.

*Primary Examiner* — Joseph S Del Sole
*Assistant Examiner* — Joseph S Leyson
(74) *Attorney, Agent, or Firm* — Goodhue, Coleman & Owens, P.C.

(57) ABSTRACT

An apparatus for use in 3D fabrication includes a heat sink, a melt tube extending through the heat sink, the melt tube having a first end and an opposite second end and adapted for melting filament or other material as the material is conveyed from the first end to the second end, a pen tip having an opening therein for ejecting melted material, the pen tip at the second end of the melt tube, and a pen tip holder for securely holding the pen tip during printing, the pen tip holder having a heater element associated therewith.

19 Claims, 11 Drawing Sheets

(51) Int. Cl.
*B33Y 30/00* (2015.01)
*B29C 48/285* (2019.01)
*B29C 48/25* (2019.01)
*B29C 48/86* (2019.01)
*B29C 64/106* (2017.01)
*B29C 64/112* (2017.01)
*B29C 64/20* (2017.01)
*B33Y 10/00* (2015.01)
*B29K 101/10* (2006.01)
*B29K 105/00* (2006.01)
*B29C 64/118* (2017.01)

(52) U.S. Cl.
CPC ............ *B29C 64/112* (2017.08); *B29C 64/20* (2017.08); *B29C 64/209* (2017.08); *B29C 64/295* (2017.08); *B29C 64/118* (2017.08); *B29K 2101/10* (2013.01); *B29K 2105/251* (2013.01); *B33Y 10/00* (2014.12)

(58) Field of Classification Search
CPC ..... B29C 48/872; B29C 48/873; B33Y 10/00; B33Y 30/00
See application file for complete search history.

(56) References Cited

U.S. PATENT DOCUMENTS

| | | | |
|---|---|---|---|
| 2013/0015596 A1* | 1/2013 | Mozeika | B25J 9/0084 264/40.1 |
| 2013/0241102 A1 | 9/2013 | Rodgers et al. | |
| 2014/0039663 A1 | 2/2014 | Boyer et al. | |
| 2014/0328963 A1* | 11/2014 | Mark | B29C 67/0088 425/143 |
| 2015/0035198 A1 | 2/2015 | Saba | |
| 2015/0137402 A1* | 5/2015 | Schmehl | B33Y 10/00 264/39 |
| 2015/0190966 A1* | 7/2015 | Griszbacher | B29C 67/0088 264/40.6 |
| 2015/0290861 A1* | 10/2015 | Douglass | B29C 47/66 264/255 |

* cited by examiner

METHOD AND APPARATUS FOR 3D FABRICATION

CROSS-REFERENCE TO RELATED APPLICATIONS

This application claims priority under 35 U.S.C. § 119 to provisional application Ser. No. 62/030,378, filed Jul. 29, 2014, which is hereby incorporated in its entirety.

FIELD OF THE INVENTION

The present invention relates to 3D printing. More particularly, but not exclusively, the present invention relates to 3D fabrication including fused filament fabrication where high temperature plastic filaments are used or other types of fabrication including plastics or metals in either filament form or powder or pellet form.

BACKGROUND OF THE ART

Fused Filament Fabrication also known by Stratasys's trade names of FUSED DEPOSITION MODELING or FDM involves extruding plastic filaments using a nozzle which is heated to melt the plastic filaments. Various problems are associated with this process. One of the most significant is the problem of how to melt and then extrude high temperature plastic filaments (such as, but certainly not limited to polyetherimide or polyphenylsulfone or particle loaded plastics), in a compact form while preventing the high temperature from spreading into undesirable areas.

Excess mass and surface area in the heated section imparts more heat via convection to the 3D printed part than is desirable. This results in the printed part warping due to thermal gradients in the part. Previously users of extruders have insulated the nozzle from the surface using various materials but problems remain. For example previous designs which have used heater cartridges installed in tubes have increased the radiating potential of the nozzle contributing to excessive undesirable printed part heating.

Low melting point metals, glass and ceramic composites, and thermoplastics exist in three primary states determined by the temperature of the material: solid, liquid, and 'gummy' Solid plastic and other materials can be forced into the extruder and liquid plastic is expelled. A key requirement for an extruder is the minimize blockage due to 'gummy' plastic lodging between the solid and liquid states. Existing extruders have used Polyetheretherketone (PEEK) and Polytetrafluoroethylene (PTFE) sleeves in order to make the flow path smoother but without addressing the core problem of allowing material to exist in the 'gummy' state. One design, the E3D does use a thin walled stainless steel tube. Yet problems remain.

Another problem relates to the need for extruders to be disassembled by trained service people in order to service the nozzle and flow path.

Yet another problem relates to the limited material choice which is restricted by filaments.

A further problem relates to the limitation in heat thus restricting the ability to print metals and metal alloys.

Thus, various problems associated with fused filament fabrication exist. What is needed are methods, apparatuses, and systems for addressing these problems.

SUMMARY OF THE INVENTION

Therefore, it is a primary object, feature, or advantage of the present invention to improve over the state of the art.

It is a further object, feature, or advantage of the present invention to provide for melting and then extruding high temperature plastic or metal filaments in a compact form while preventing the high temperature from spreading into undesirable areas.

It is a still further object, feature, or advantage of the present invention to provide for easy removal of extrusion nozzles in order to facilitate ease of use.

It is another object, feature, or advantage of the present invention to provide a quick-disassembly mechanism which does not require special training to operate.

It is yet another object, feature, or advantage of the present invention to allow for diverse pen tips to be utilized including those described in U.S. patent application Ser. No. 12/552,448 (U.S. Published Patent Application No. 20100055299, titled " Dispensing patterns including lines and dots at high speeds") (herein incorporated by reference in its entirety), and those which reduce pressure such as through a specific conical shape.

It is a further object, feature, or advantage of the present invention to reduce the heat-radiating portion of a nozzle to a cone.

It is a still further object, feature, or advantage of the present invention to eliminate the need for heater cartridges installed in tubes which increase the radiating potential of the nozzle contributing to excessive undesirable printed part heating.

It is another object, feature, or advantage of the present invention to provide an extruder which minimizes blockage due to "gummy" plastic lodging between the solid and liquid states.

It is yet another object, feature, or advantage of the present invention to provide a swappable dovetail mount.

It is a further object, feature, or advantage of the present invention to provide a swappable tool changer interface for FDM.

It is a still further object, feature, or advantage of the present invention to allow for non-circular nozzle holes such as for extrusion to an oval or a slot shaped hole to allow for larger surface coverage per pass thus reducing the number of passes and increasing the build speeds.

Another object, feature, or advantage of the present invention to allow for slotted nozzles for increased speed.

Yet another object, feature, or advantage of the present invention is to allow for parallel nozzles that print simultaneously.

A still further object, feature, or advantage of the present invention is to allow for multiple nozzles on a single pump where each nozzle is allowed to operate independently for rastering and filling unique, digital patterns.

Another object, feature, or advantage of the present invention is to allow for parallel printing utilizing a raster scan for larger area print coverage in one pass.

Yet another object, feature, or advantage of the present invention is to provide for improved methods for pushing materials through a nozzle such as a hopper design coupled with an auger screw to pull material and push it through the nozzle where a pump is used instead of using a filament fed approach.

Yet another object, feature, or advantage of the present invention is to allow for metals to be printed.

Yet another object, feature, or advantage of the present invention is to eliminate restrictions on material choice imposed by filaments and allow for direct powder or pellets to be used to allow for many more types of materials to be used.

A still further object, feature, or advantage of the present invention is to remove limitations in heat which restrict the ability to print metals and metal alloys.

Another object, feature, or advantage of the present invention is to print using materials which are particle loaded.

A further object, feature, or advantage of the present invention is to provide for easy removal of extrusion nozzles to facilitate ease of use. A still further object, feature, or advantage of the present invention is to provide a quick-disassembly mechanism which does not require special training to operate.

Another object, feature, or advantage of the present invention is to allow for diverse pen tips to be used including pen tips with shapes that reduce pressure given a specific conical shape.

Yet another object, feature, or advantage of the present invention is to use a hopper and auger to replace the filament fed approach.

It is to be understood that although various objects, features, or advantages are described herein, no single embodiment need exclude each or every object, feature, or advantage as different objects, features, or advantages.

According to one aspect, an apparatus for use in fused material fabrication is provided. The apparatus includes a heat sink, a melt tube extending through the heat sink, the melt tube having a first end and an opposite second end and adapted for melting material as the material is conveyed from the first end to the second end, a pen tip having an opening therein for ejecting melted material, the pen tip at the second end of the melt tube, and a pen tip holder for securely holding the pen tip during printing, the pen tip holder having a heater element associated therewith. The pen tip, the pen tip holder, and the heater element may form an integrated part with the heater element conformally printed on the pen tip or pen tip holder. There may be a cooling unit for cooling the first end of the melt tube. The cooling unit may be a fan to provide forced air cooling of the first end of the melt tube or other type of cooling unit. The melt tube may be comprised of a metal such as stainless steel and may have thin walls. The pen tip may have a cone-shaped profile. There may also be a body or enclosure and portions of the apparatus may be disposed within the body and wiring may be printed on a side of the body. The pen tip may include a ceramic material. The heater element may include a heater stick positioned within the pen tip holder, or a heater coil positioned within the pen tip holder. The cooling unit may selectively cool a portion of the apparatus. A heating system may be configured to selectively heat a portion of a build unit. The heating system may include a laser, an infrared heat source, or an ultrasonic wave generator. The apparatus may further include a hopper and an auger for conveying the material. The material may comprise a filament, may be comprised of metal, plastic, powder, or other type of material.

According to another aspect, a method for fabricating an object is provided. The method may include providing an apparatus for use in fused material fabrication, the apparatus comprising (a) a heat sink, (b) a melt tube extending through the heat sink, the melt tube having a first end and an opposite second end and adapted for melting material as the material is conveyed from the first end to the second end, (c) a pen tip having an opening therein for ejecting melted material, the pen tip at the second end of the melt tube, and (d) a pen tip holder for securely holding the pen tip during printing, the pen tip holder having a heater element associated therewith. The method may further include receiving a material into the melt tube, melting the material while in the melt tube to provide melted material, and conveying the melted material from the pen tip to form a portion of the object. The method may further include selectively heating or cooling portions of the apparatus. The method may further include selectively heating portions of the object. The method may also further include receiving the material from a hopper via an auger.

Another aspect to this invention is the temperature isolation that may be needed to shield excess heat from radiating into other tools or pumps in proximity to the nFD pump. This type of shield provides protection for materials in proximity that are sensitive to heat and may cure in the pump device. Directed and localized temperature heating and cooling provide for more control over the entire printing process when multiple materials are utilized.

Another aspect to this invention is the distributed and localized heating that allow a reduction in delamination of layered materials that are the natural results of layer by layer manufacturing. Typical large builds will have a large thermal mismatch and this mismatch causes the structure to warp as different parts of the structure cool and heat at different rates. These changes can cause warping and delamination. To stop this some have heated the entire build chamber. To avoid heating the entire build chamber, localized or directed heat is used to control the heat differential in gradients. As a section of the structure becomes larger, it becomes more rigid and the delamination and warping is controlled. This approach maintains heat in sections to reduce or eliminate warping and delamination.

There are a variety of heating sources to include laser, light emitting diodes, RF, microwave, acoustic, inductive, heated air, convection and IR to name a few.

According to another aspect, utilizing low pressure angled tips, it is possible to print lines below 100 microns wide. The design allows for pen tips to be changed quickly and including small nozzle pen tips. Small nozzle pen tips range from 10 microns to 100 microns in the inner diameter portion of the pen tip and the shape of the orifice or duct can change according to need. Pen tips can be configured to go below 10 microns and above 100 microns, both of which can also be utilized in the design and with a variety of shapes for the duct passing through the pen tip.

According to another aspect, a removable heater holder that physically holds the pen tip, but also heats the pen tip up is provided. A variety of pen tips can be utilized to include metal, ceramic, plastic or a composite. The removable pen tip allows for specialty tips to be utilized without the need to apply heat directly to the tips.

DETAILED DESCRIPTION

The present invention provides for safely melting high temperature plastic filaments by the use of a thin walled stainless steel tube between the hot and cold ends of the melt tube. This acts as a thermal choke that prevents heat transfer into the undesired areas, but does so in a much smaller space than other solutions thus effectively reducing the amount of 'gummy' material. Furthermore, because this thin wall section and all materials below it are either constructed from stainless steel or ceramic, it is able to reach the extreme temperatures needed to melt high temperature thermoplastic filaments. Existing designs incorporating plastics in their melt tubes are not able to reach these temperatures. The heated section is comprised of a heater printed onto a screw-on nozzle holder that simultaneously heats up the ceramic pen tip while securing it to the end of the liquefier tube. Printing the heater coil directly onto the holder rather than using a conventional heater cartridge reduces the thermal mass and allows the nozzle to have an overall cone-shaped profile thus minimizing the amount of heat imparted into the part that is being printed and reducing warping of the part being printed.

Figure 1:
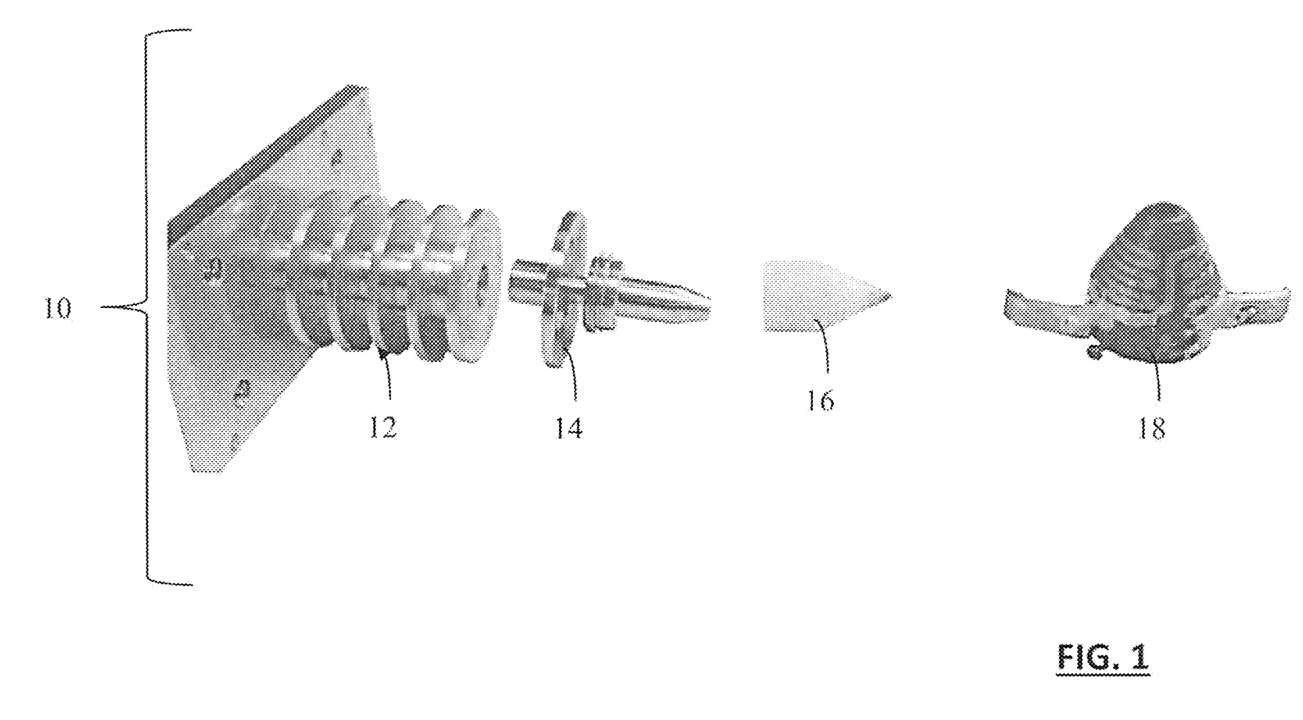
FIG. 1 is a breakdown of one embodiment.

FIG. 1 pictorially illustrates components of an apparatus 10 according to one embodiment. The apparatus 10 includes a heat sink 12. The heat sink 12 is designed to function with forced air cooling in order to prevent heat from building up in the cold end of the melt tube. Element 14 contains both the thin walled stainless steel tube and the threads which the heater of element 18 screws on to. It is this piece that prevents the majority of the heat from moving upwards in the system. Element 16 is the ceramic pen tip. This part is heated by the heater of element 18, allowing it to melt the plastic filament as it passes by. The filament is then ejected from the opening in the pen tip of element 16. Element 18 is the pen tip holder with integral heater, which heats up the pen tip of element 16. Its outer profile on its lower end is conically-shaped with the smallest diameter terminating in the pen tip of element 16 in order to reduce heat build-up in the part being printed below. The pen tip of element 16 inserts into the holder 18 which then screws onto element 14. This holds the pen tip of element 16 securely during the printing process while ensuring a good thermal junction from the heater to the pen tip. Utilizing low pressure angled tips, lines below 100 microns wide can be printed. The design allows for pen tips to be changed quickly and including small nozzle pen tips. Small nozzle pen tips can range from 10 microns to 100 microns for the inner diameter duct portion of the pen tip of element 16. Pen tips that go below 10 microns can also be utilized with the apparatus 10. A removable heater holder of element 18 physically holds the pen tip of element 16, but also heats the pen tip up is provided. A variety of pen tips can be utilized to include metal, ceramic, plastic or a composite. The removable pen tip of element 16 allows for specialty tips to be utilized without the need to apply heat directly to the tips.

Another extension of this design is the integration of the tip, tip holder and heater as one monolithic tip/nozzle.

In addition to the heater and heat extrusion is the dispensing patterns on each pass of the extruded print. Typically, the nozzle of element 16 is a circular shape and is heated to allow a small uniform strip to be printed. This new design changes from a circular nozzle duct for extrusion to an oval or a slot shaped duct for extrusion. This allows for larger surface coverage per pass thus reducing the number of passes and increasing the build speeds.

In addition to the benefits of an oval or a slot shaped duct for extrusion, the printed part or the nozzle of element 16 or the pump device can be rotated to maintain a specific angle against the path of printing. For example, the slot can be normal to the path of printing or the print part. If a different angle is desired of the slot relative to the path of printing or the print part, rotational and angle adjustments, such as adjustments made under computer control, can be made to the printed part or the nozzle of element 16 or the pump device.

In addition to the nozzles with slotted ducts for increased speed, parallel nozzles can print simultaneously. This new design has multiple nozzles on a single pump but allows each nozzle to operate independently for rastering and filling unique, digital patterns. A number of heated printers or tools have done multiple nozzles, but not parallel printing utilizing a raster scan for larger area print coverage in one pass.

In addition, a hopper design coupled with an auger screw may be used to pull material and push it through the nozzle of element 16. There are mixing and extruding equipment, but these are not pumps. The hopper and auger combination replace the filament fed approach.

In addition, a swappable dovetail mount and a swappable tool changer interface may be used.

Figure 2:
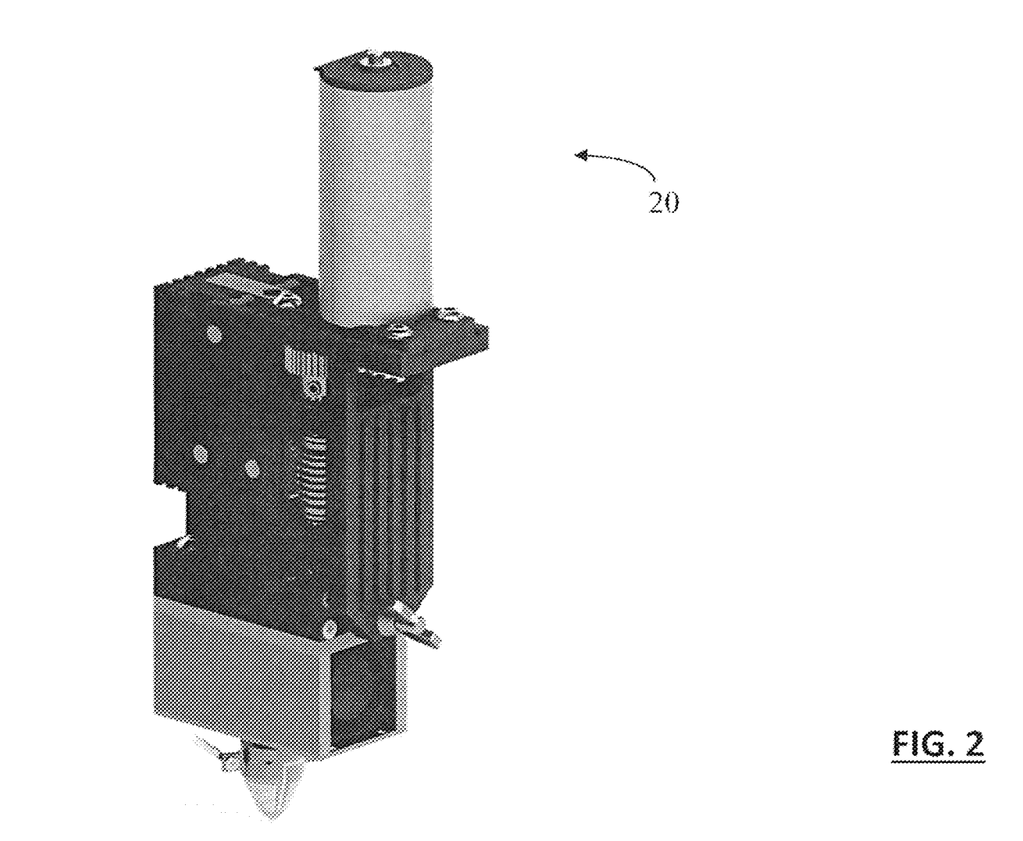
FIG. 2 is a side perspective view.
Figure 3:
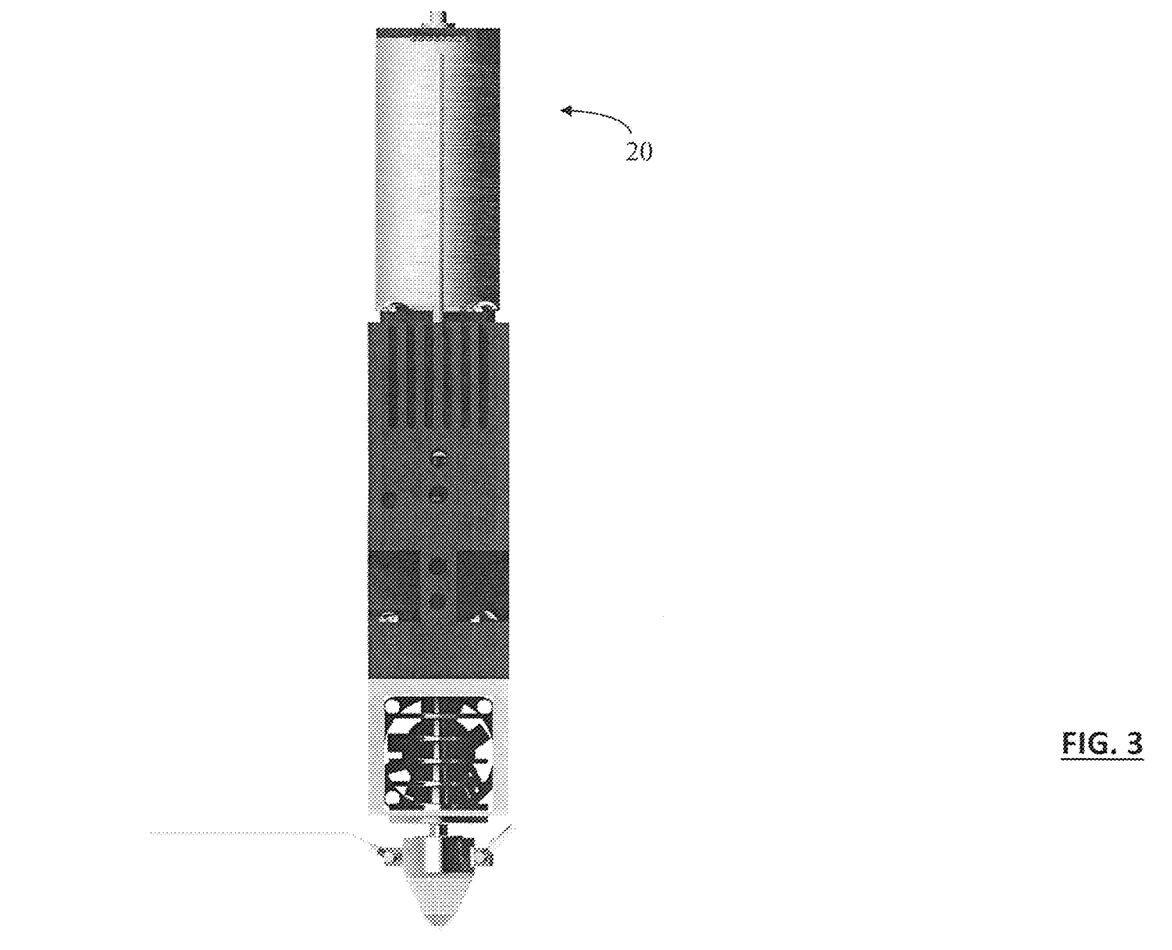
FIG. 3 is a back view.
Figure 4:
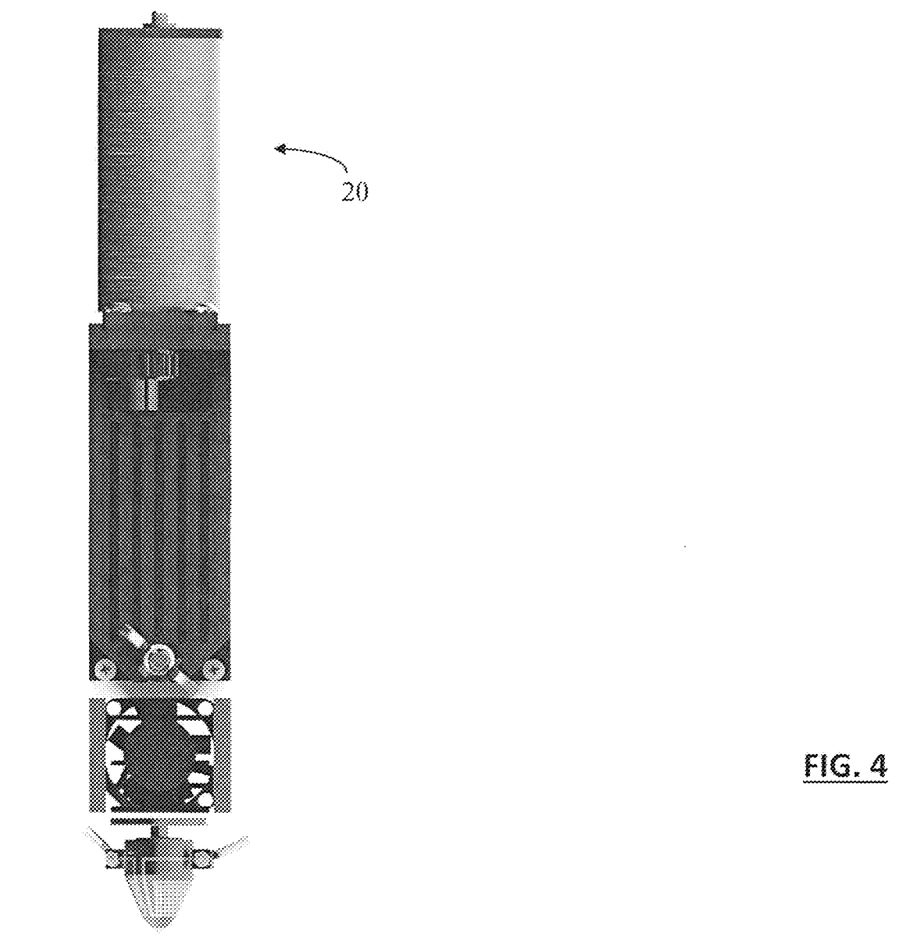
FIG. 4 is a front view.

FIG. 2 is a perspective view showing an assembly 20 incorporating the apparatus 10. FIG. 3 is a back view of the assembly 20. FIG. 4 is a front view of the assembly 20.

Figure 5:
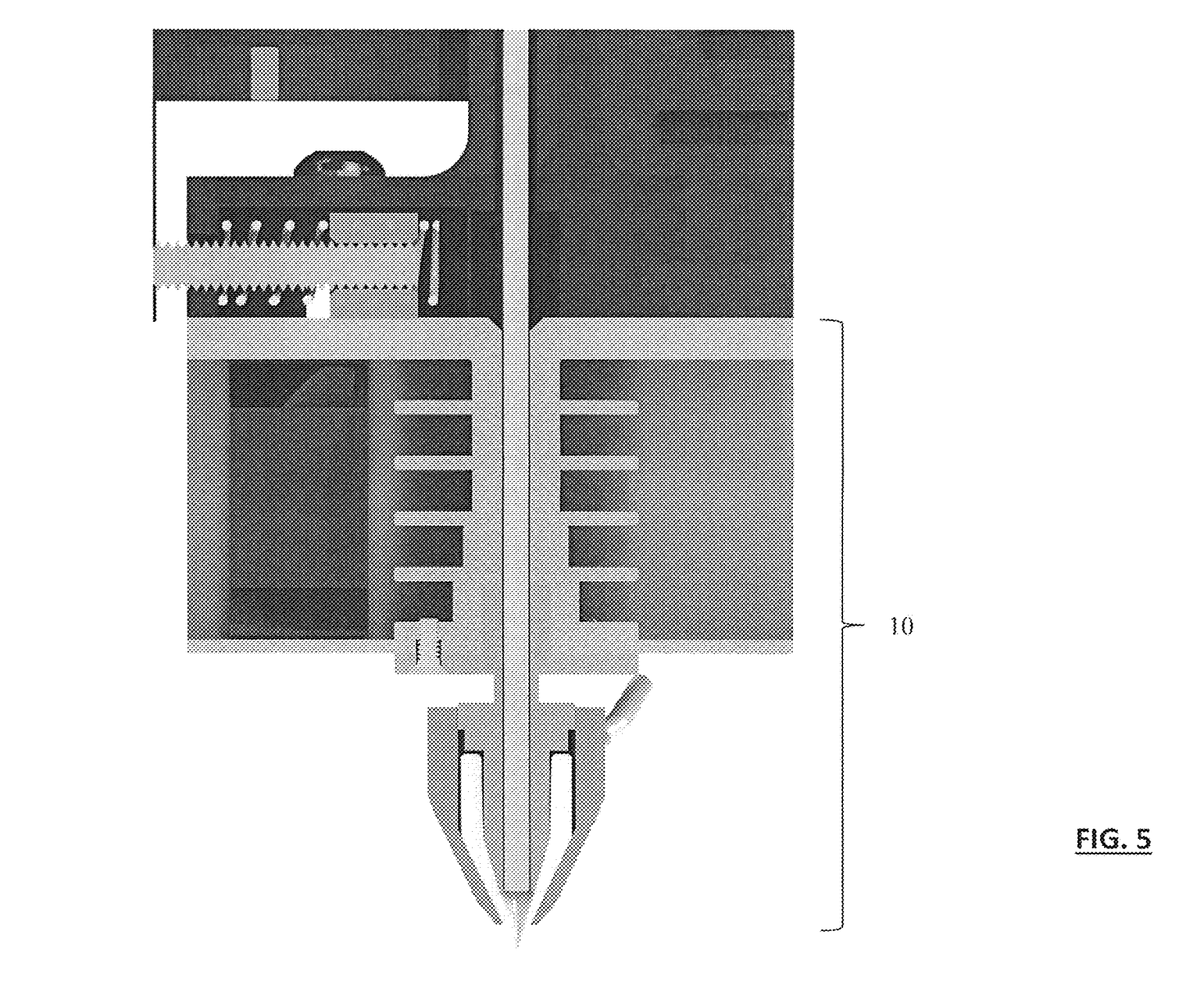
FIG. 5 is a side liquefier cross-sectional view.

FIG. 5 is a side liquefier cross-sectional view showing the apparatus 10.

Figure 6:
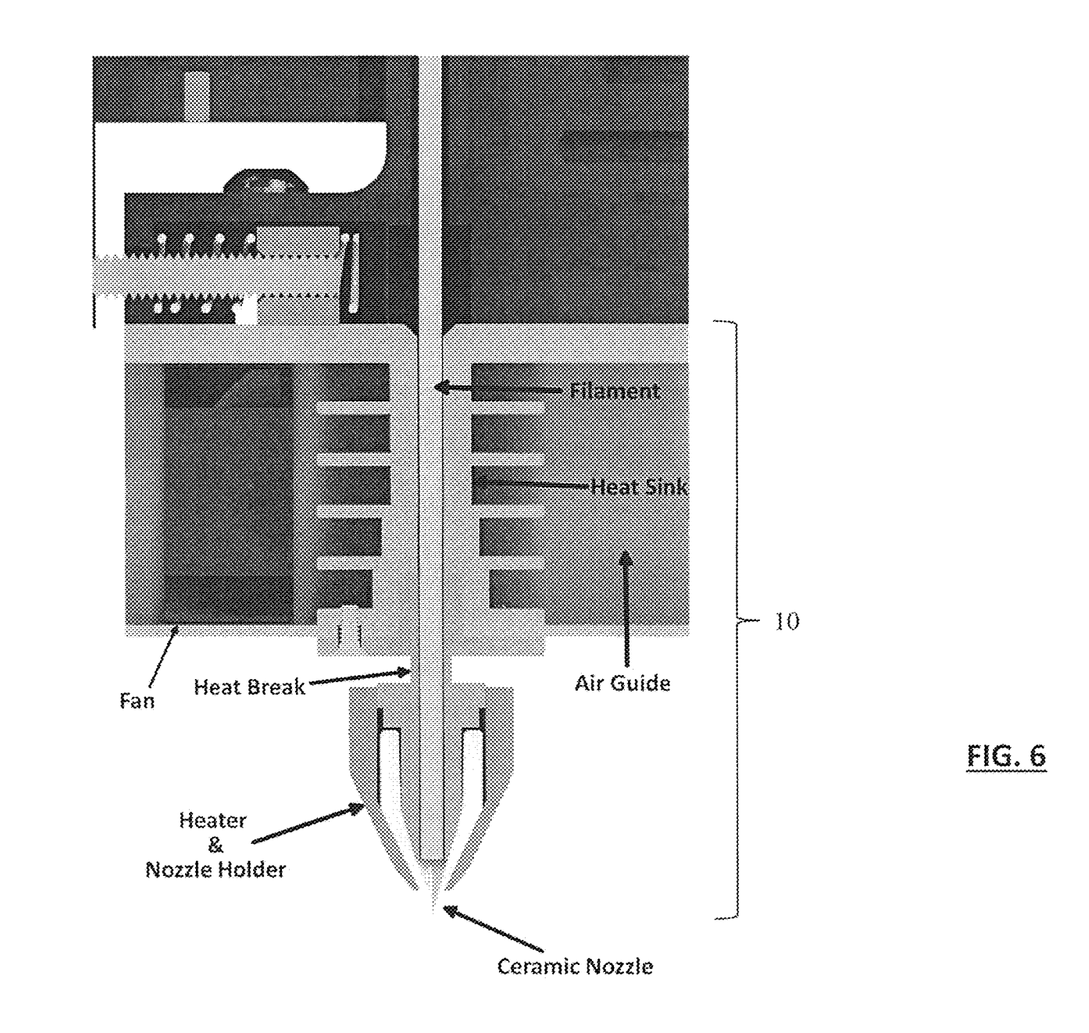
FIG. 6 is another side liquefier cross-sectional view.

FIG. 6 is another side liquefier cross-sectional view showing the apparatus 10.

Figure 7:
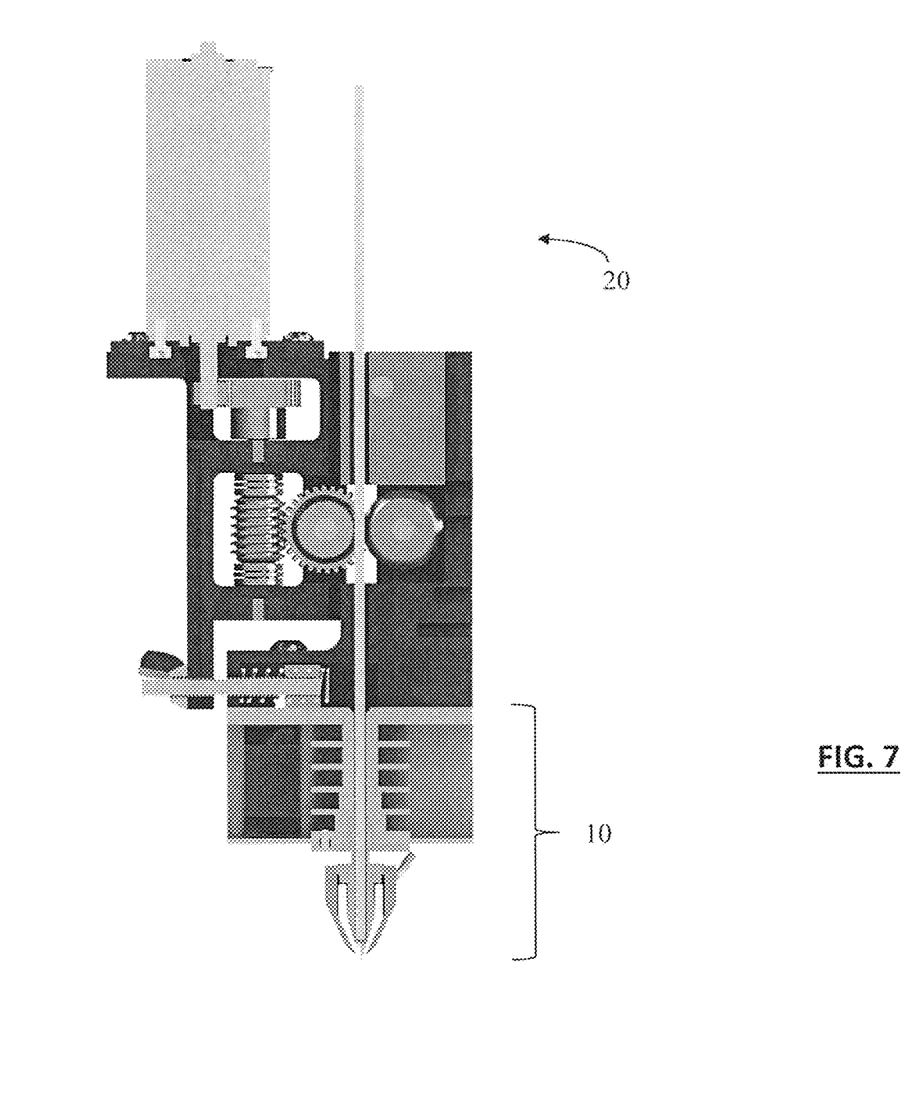
FIG. 7 is a side cross-sectional view.
Figure 8:
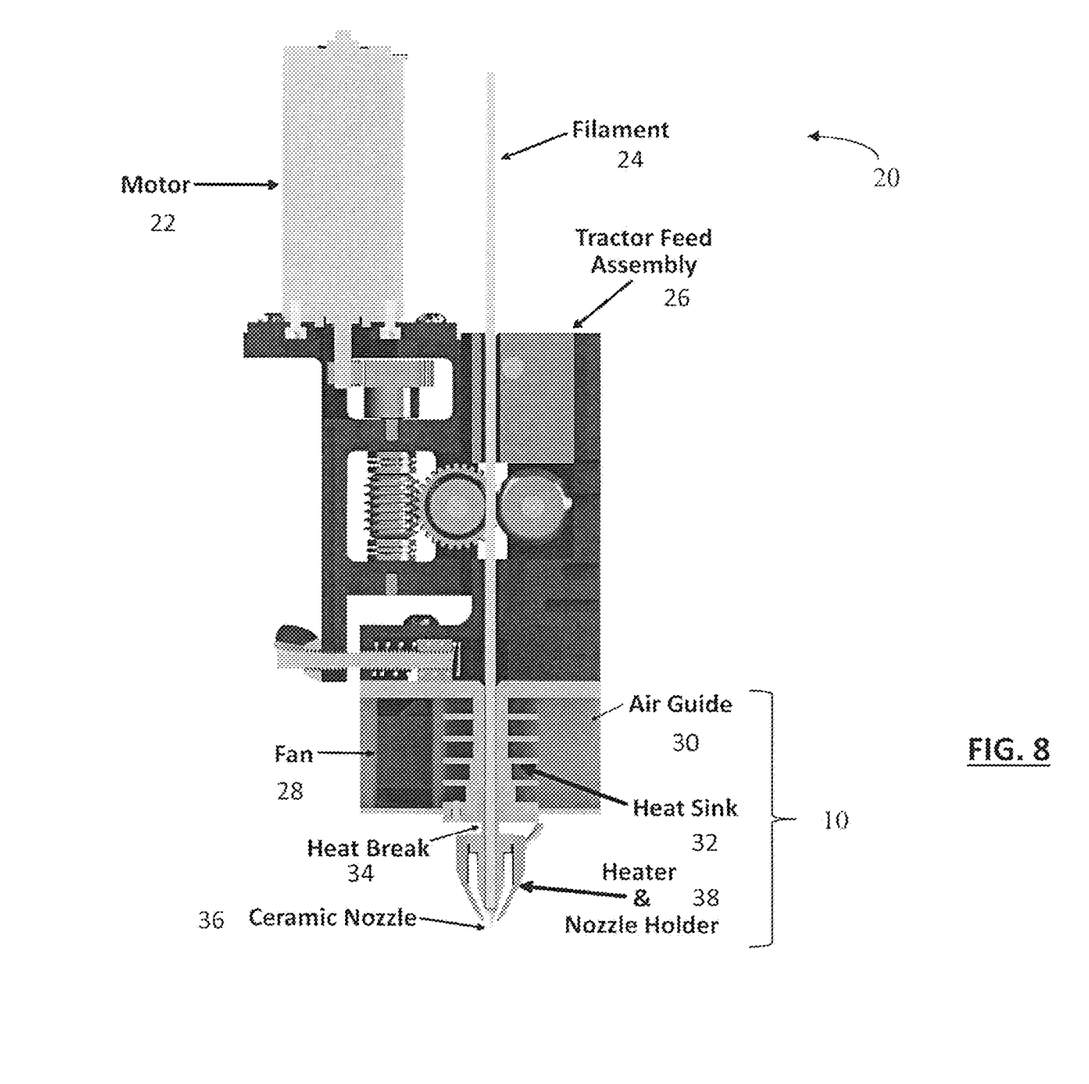
FIG. 8 is a side cross-sectional view.

FIG. 7 is a side cross-sectional view showing the full assembly 20 incorporating the apparatus. FIG. 8 is a side cross-sectional view of the assembly 20 including a motor 22 mounted on a top of the assembly. A tractor feed assembly 26 operable from input by the motor 22 is provided for feeding a filament 24. Components within the assembly 10 are shown including a fan 28 for cooling, an air guide 30, and a heat sink 32. A heat break 34 is interdisposed between the heat sink 32 and the heater and nozzle holder 38, in which a nozzle 36, such as a ceramic nozzle, is positioned.

Also note that the heating/cooling isolation is provided. Although fan 28 is shown, alternative means may be used for cooling such as a water jacket or a piezoelectric cooler or other cooling means. The heating and cooling are localized, distributed, and/or focused. In other words, instead of heating the entire enclosure, only specific areas are heated and cooled.

This localized heating also relates to the build unit. In typical FDM, for large builds by example, ones needs to heat the entire builder chamber, in other words, one is effectively printing inside an oven. The reason for such an approach is to address the thermal gradient that occurs during the build process. The material coming out of the pen tip is hot, as it cools, the build can warp a bit. To reduce warping, the material is printed on a heated bed. So layer after layer stays warm and the hot material is resting on warm material. They fuse together and stay warm. Once the print is done, the entire structure is allowed to cool down with a constant temperature throughout the printed structure. This reduces warping. If the structure is large, then the heated bed keeps the bottom section warm, the upper section will be cool which means hot plastic is being printed on cool plastic, and even though it can still fuse, the build will likely warp.

To remedy this, the present invention allows for providing localized or directed heat at sections of the part to allow sections to stay warm and not warm and sections to cool down together and the sections will be stronger as a fused whole than single layers. Thus, localized or directed heat of sections allows for reductions in warping. This may be performed in various ways including with lasers heating up sections, IR lamps heating up sections, or ultrasonic waves heating up sections, or performed in any number of other ways that permit localized or directed heating or cooling.

Figure 9:
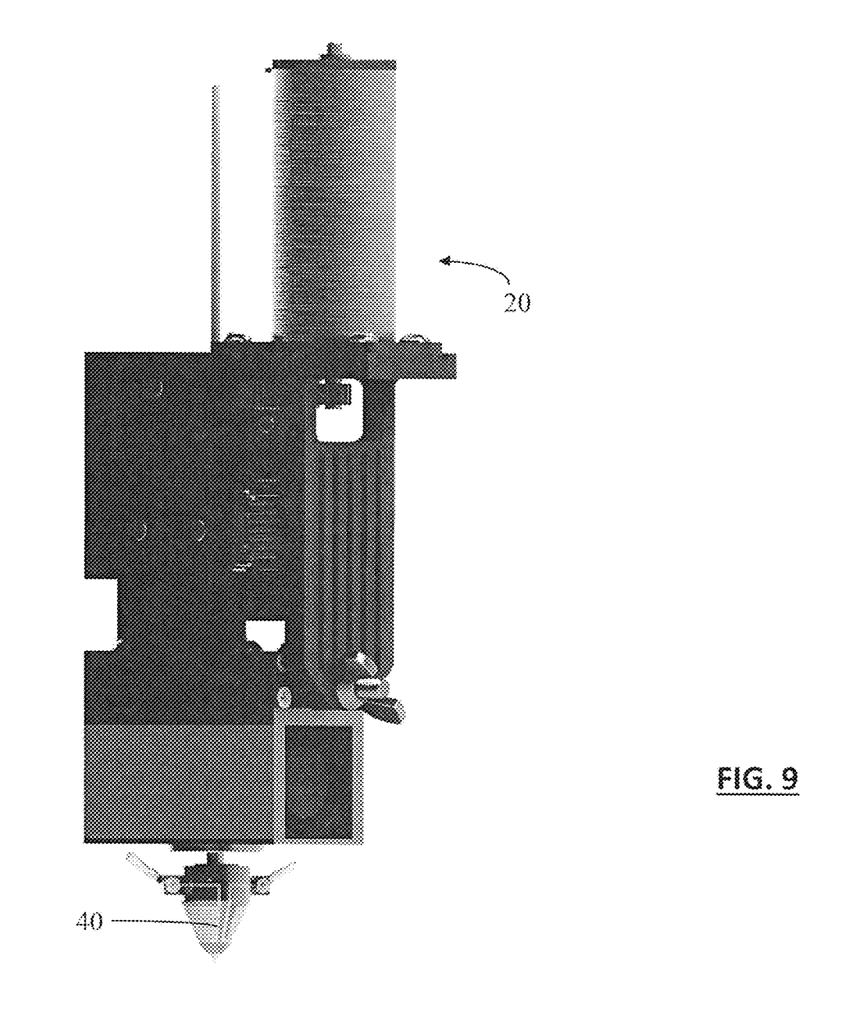
FIG. 9 is another side perspective view.

FIG. 9 is another side perspective view of the assembly 20. Note the printed heater coil 40. Optionally, heater sticks may be used which are placed inside a small pen tip holder of element 18. According to another aspect, wiring may be printed on the side of the body of the assembly 20 thereby eliminating wire connections. This conformal wiring approach reduces the space required for wiring and may increase durability. Such wiring may provide the current for the heater coil 40 or heater sticks. Thus various ways of assembly are contemplated including using wires and heater sticks or printed wires and eater coils or combinations thereof.

Figure 10:
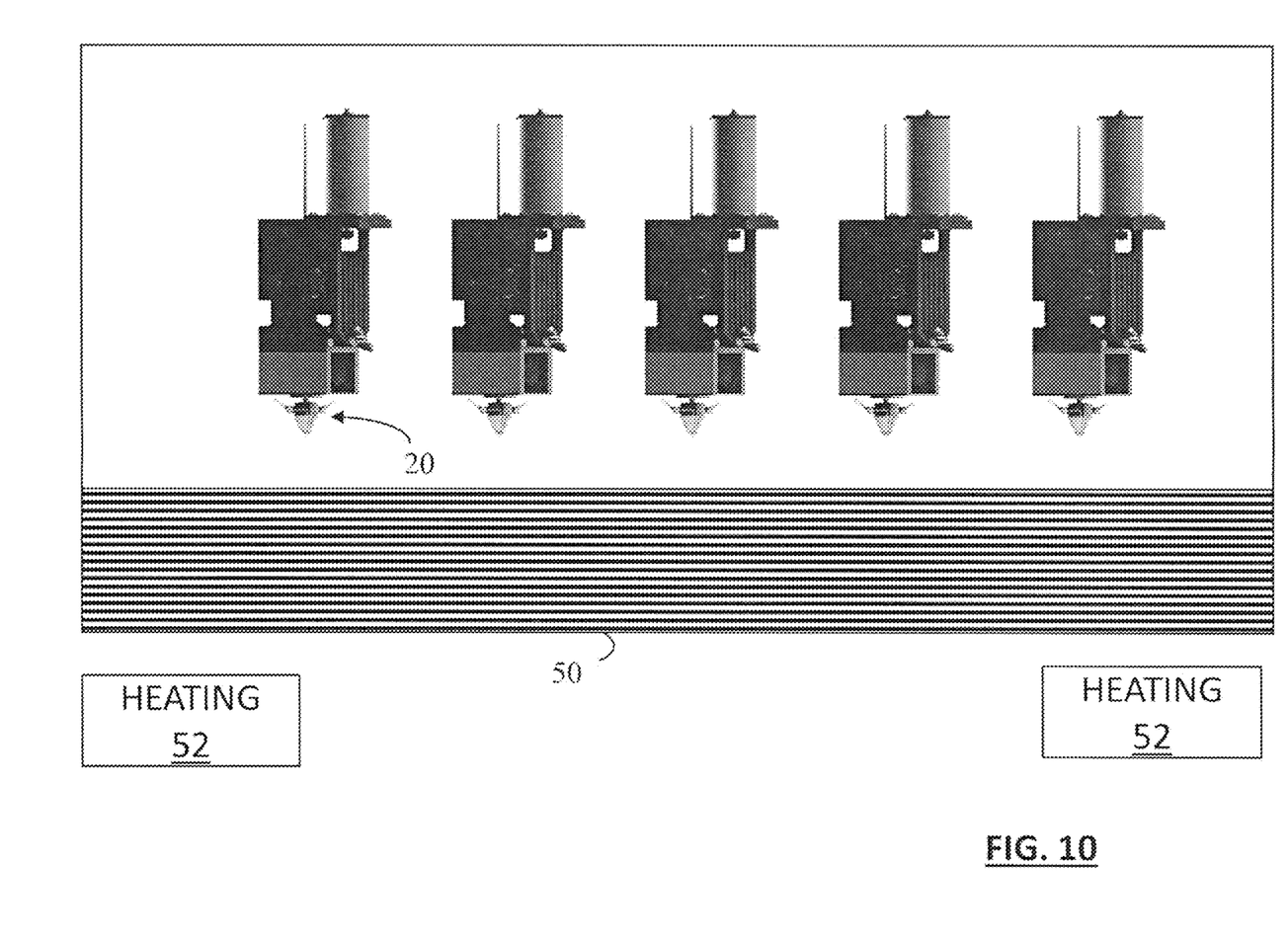
FIG. 10 illustrates a plurality of units in parallel for work within a build area.

FIG. 10 illustrates a plurality of assemblies 20 in parallel for work within a build area 50. One or more heaters 52 may be used to provide for localized or directed heat at sections of the part to allow sections to stay warm and not warm and sections to cool down together and thereby the fused sections will be stronger as a whole than single layers. Thus, localized or directed heat of sections allows for reductions in warping. This may be performed in various ways including with the heaters including lasers heating up sections, IR lamps heating up sections, or ultrasonic waves heating up sections, or performed in any number of other ways that permit localized or directed heating or cooling.

Thus, according to one aspect is that the temperature isolation that may be needed to shield excess heat from radiating into other tools or pumps in proximity to the nFD pump. This type of shield provides protection for materials in proximity that are sensitive to heat and may cure in the pump device. Directed and localized temperature heating and cooling provide for more control over the entire printing process when multiple materials are utilized.

According to another aspect, the distributed and localized heating that allow a reduction in delamination of layered materials that are the natural results of layer by layer manufacturing. Typical large builds will have a large thermal mismatch and this mismatch causes the structure to warp as different parts of the structure cool and heat at different rates. These changes can cause warping and delamination. To stop this some have heated the entire build chamber. To avoid heating the entire build chamber, localized or directed heat is used to control the heat differential in gradients. As a section of the structure becomes larger, it becomes more rigid and the delamination and warping is controlled. This approach maintains heat in sections to reduce or eliminate warping and delamination. There are a variety of heating sources to include laser, light emitting diodes, RF, microwave, acoustic, inductive, heated air, convection and IR to name a few.

Figure 11:
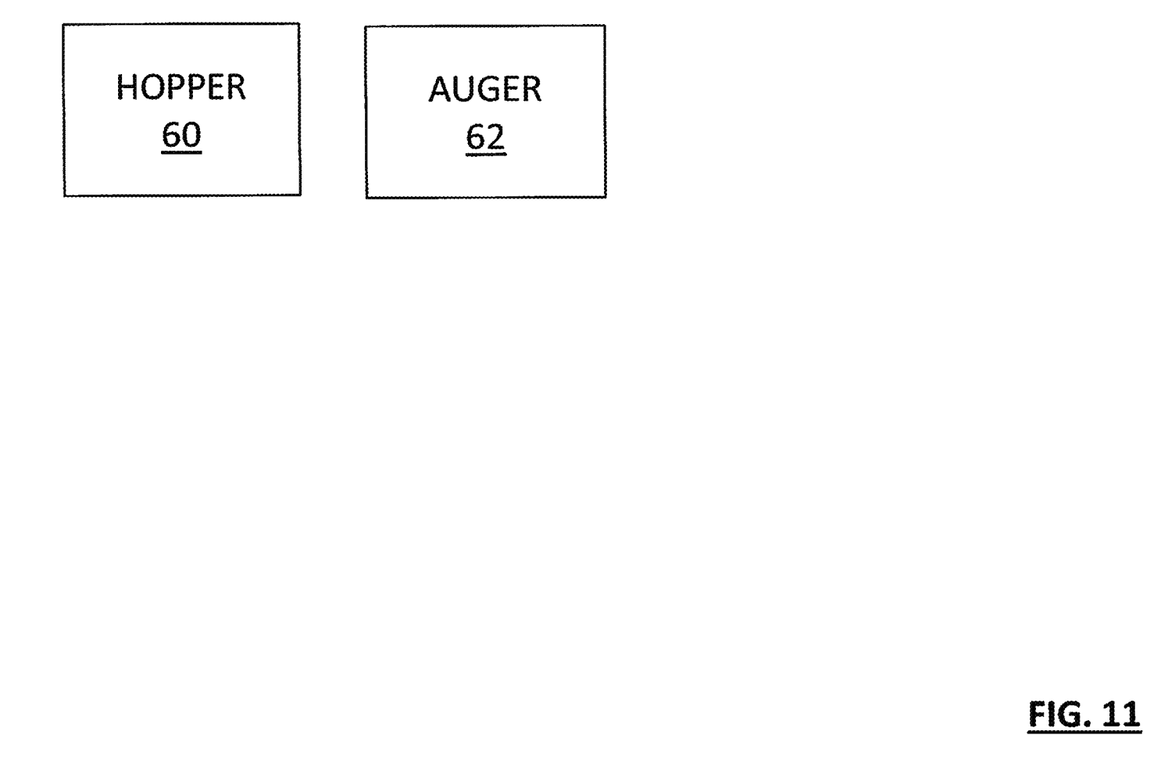
FIG. 11 illustrates a hopper and auger.

FIG. 11 illustrates a hopper 60 and auger 62 which may be used to feed filaments into the apparatus as discussed above.

Although various specific embodiments are shown and described herein, it is to be appreciated that any number of additional options, variations, and alternative embodiments are contemplated. The present invention is not to be limited to the specific embodiments shown herein.

What is claimed is:

1. An apparatus for use in 3-D fabrication, the apparatus comprising:
    a heat sink configured to dissipate heat;
    a melt tube having a first end and an opposite second end and adapted for heating a material as the material is conveyed between the first end and the second end;
    a pen tip having an opening therein for ejecting melted material; and
    a pen tip holder configured to securely hold the pen tip, the pen tip holder disposed apart from the heat sink, the pen tip holder having a heater element;
    wherein the melt tube comprises a thin walled section such that only the melt tube of the apparatus extends between the heat sink and the pen tip holder for a distance thereby forming a heat break;
    wherein the pen tip is inserted into the pen tip holder and over the second end of the melt tube and wherein the pen tip holder is threadably secured to the melt tube to thereby hold the pen tip in position.

2. The apparatus of claim 1 wherein the pen tip, the pen tip holder, and the heater element form an integrated part with the heater element conformally printed on the pen tip or pen tip holder.

3. The apparatus of claim 1 further comprising a cooling unit for cooling the first end of the melt tube.

4. The apparatus of claim 3 wherein the cooling unit comprises a fan to provide forced air cooling of the first end of the melt tube.

5. The apparatus of claim 1 wherein the melt tube is comprised of metal.

6. The apparatus of claim 5 wherein the melt tube comprises a stainless steel tube.

7. The apparatus of claim 1 wherein the pen tip has a cone-shaped profile.

8. The apparatus of claim 1 further comprising a body wherein portions of the apparatus are disposed within the body and wherein wiring is printed on a side of the body.

9. The apparatus of claim 1 wherein the pen tip comprises a ceramic material.

10. The apparatus of claim 1 wherein the heater element comprises a heater stick positioned within the pen tip holder.

11. The apparatus of claim 1 wherein the heater element comprises a heater coil positioned within the pen tip holder.

12. The apparatus of claim 1 further comprising a cooling unit to selectively cool a portion of the apparatus.

13. The apparatus of claim 1 further comprising a heating system configured to selectively heat a portion of a build unit.

14. The apparatus of claim 13 wherein the heating system comprises a laser, an infrared heat source, or an ultrasonic wave generator.

15. The apparatus of claim 1 wherein the material comprises filaments.

16. The apparatus of claim 15 wherein the filaments comprise plastic.

17. The apparatus of claim 1 wherein the material comprises metal.

18. The apparatus of claim 1 wherein the material comprises powder.

19. An apparatus for use in 3-D fabrication, the apparatus comprising:
    a heat sink configured to dissipate heat;
    a melt tube having a first end and an opposite second end and adapted for heating a material as the material is conveyed between the first end and the second end;
    a pen tip having an opening therein for ejecting melted material;
    a pen tip holder configured to securely hold the pen tip, the pen tip holder disposed apart from the heat sink, the pen tip holder having a heater element associated therewith; and
    a heat break consisting of a thin walled section of the melt tube in between the heat sink and the pen tip holder, the heat break acting as a thermal choke to reduce heat transferred to the heat sink;
wherein the pen tip is inserted into the pen tip holder and over the second end of the melt tube and wherein the pen tip holder is threadably secured to the melt tube to thereby hold the pen tip in position.

* * * * *